United States Patent [19]

Mathivat et al.

[11] Patent Number: 5,268,016
[45] Date of Patent: * Dec. 7, 1993

[54] APPARATUS FOR OBTAINING CAMBERED AND/OR GLAZED GLASS SHEETS

[75] Inventors: Denis Mathivat; Bernard Letemps, both of Thourotte; Francois Malard, Compiegne, all of France

[73] Assignee: Saint-Gobain Vitrage International, Courbevoie, France

[*] Notice: The portion of the term of this patent subsequent to Mar. 31, 2009 has been disclaimed.

[21] Appl. No.: 764,451

[22] Filed: Sep. 24, 1991

Related U.S. Application Data

[62] Division of Ser. No. 546,733, Jul. 2, 1990, Pat. No. 5,100,454.

[30] Foreign Application Priority Data

Jul. 18, 1989 [FR] France .................. 89 09597

[51] Int. Cl.[5] .......................................... C03B 23/023
[52] U.S. Cl. .......................................... 65/273; 65/287; 65/355
[58] Field of Search ................ 65/103, 106, 107, 273, 65/287, 288, 355

[56] References Cited

U.S. PATENT DOCUMENTS

| | | | |
|---|---|---|---|
| 2,969,613 | 1/1961 | Lambert et al. | 65/273 |
| 3,778,244 | 12/1973 | Nedelec et al. | 65/106 |
| 4,764,196 | 8/1988 | Boutier et al. | 65/106 |
| 4,775,402 | 10/1988 | Letemps et al. | 65/107 |
| 4,802,903 | 2/1989 | Kuster et al. | 65/106 |
| 4,813,993 | 3/1989 | Letemps et al. | 65/273 |
| 4,865,638 | 9/1989 | Kudo | 65/273 |
| 4,902,331 | 7/1990 | Vanaochen et al. | 65/106 |

*Primary Examiner*—Joye L. Woodard
*Attorney, Agent, or Firm*—Oblon, Spivak, McClelland, Maier & Neustadt

[57] ABSTRACT

An apparatus for cambering glass sheets includes a reheating furnace for reheating a glass sheet, a sealed cambering station and a conveyor for transferring a heated glass sheet from the furnace to the cambering station. The cambering station includes a shaping upper member. The glass sheet therein is raised into engagement with the upper member, for example by gas pressure, in order to camber the glass sheet. Hot gas ducts surrounding the upper member blow hot gas onto the upper member in such a way as to increased the temperature thereof to a temperature higher than that of the glass sheet when the glass sheet enters the cambering station. Therefore, the glass sheet can be introduced into the cambering station at a relatively low temperature and heated to a temperature high enough for cambering only when in contact with the upper member. The cambered glass sheet can then be discharged to a cooling station.

2 Claims, 1 Drawing Sheet

APPARATUS FOR OBTAINING CAMBERED AND/OR GLAZED GLASS SHEETS

This is a division of application Ser. No. 07/546,733, filed on Jul. 2, 1990, now U.S. Pat. No. 5,100,454.

BACKGROUND OF THE INVENTION

1. Field of the Invention

The invention relates to a process and to an apparatus for obtaining cambered and/or glazed glass sheets usable as car windows. It more specifically relates to a process according to which the glass sheets are reheated flat in a traversing furnace, brought into a cambering station below a shaping upper member, raised and applied by suction to said upper member, and deposited on a lower member on which they are passed into a cooling, and in particular tempering, station.

2. Description of the Related Art

Great importance is attached in the production of car windows to obtaining the maximum optical quality, which obviously requires the absence of gripper marks and scratches. With respect to an even more severe quality standard, this also assumes the absence of optical defects due to the heat treatment undergone by the glass sheet. A particular example of such a defect is that resulting from the deformations of the glass sheet caused by its non-uniform support, e.g., by rollers, between which the glass sheet raised to a high temperature may sag under its own weight. The resulting undulations do not really produce contour defects, which is in accordance with what is required from the macroscopic standpoint, but a sight seen through the glass plate is deformed.

These undulations are produced in the final part of the furnace and/or in the cambering station when the temperature of the glass is at its maximum. In order to prevent these, it is indispensable to keep the temperature below a threshold, where the deformation reaction kinetics are still sufficiently low compared with the glass sheet travel speed. The present inventors have found that this condition is generally satisfied if the temperature of the glass sheet does not exceed approximately 630° C. However, such a temperature is inadequate at least in two possibly cumulative cases, namely where the glass sheet must be bent in accordance with a small radius of curvature and/or the glass sheet surface is totally or partly covered by a glazing composition.

In the first case, an excessively cold glass may lead to the breakage of the glass plate or window, whose viscosity does not make it possible to relax the stresses arising during cambering, except when proceeding extremely slowly, which is not compatible with the requirements of industrial production. It is certainly known from the art to bring about a very localized superheating or overheating by spreading over the glass at its entry into the furnace a powder of the carbon black type and/or by equipping the furnace with additional heating means travelling parallel to the glass (cf., e.g., U.S. Pat. No. 4,441,987 or DE-A-3742481). However, either these means must only act on a small part of the glass plate surface, or precisely the same undulation problems will occur on leaving the furnace.

In the second case, an inadequate temperature does not permit the complete baking of the glazing composition. When the glass sheet is brought into contact with the upper member, the latter or more precisely its coating, e.g., based on refractory fiber paper, may be stained by the still liquid composition and may dirty the following glass plates. Independently of the curvature which may or may not have to be given to the glass sheet, it is once again preferable to work with glass sheets whose temperature is, e.g., above 650° C., which leads to the aforementioned optical defects.

SUMMARY OF THE INVENTION

An object of the present invention is to improve the procedures for obtaining cambered and/or glazed and optionally tempered glass sheets, in which an upper member is used with a view to producing glass plates or windows having a high optical quality, and which are in particular free from undulation or corrugation defects.

The invention is an improvement of a process for obtaining cambered-tempered windows, e.g., according to the teachings of FR-A-2085464, EP-A-3391, EP-A-240418 or EP-A-241355. According to such a process, the glass sheets are individually fed flat into a reheating furnace which they traverse, e.g., while conveyed by a roller bed, are brought into a cambering station located at the end of the reheating furnace and constituted by an optionally thermally insulated, closed enclosure, and are then passed into a cooling and tempering station. In the cambering station, each glass sheet is positioned beneath an optionally shaped shaping upper member, is engaged against the upper member, e.g., while being raised by suction due to a vacuum created in the vicinity of the glass sheet, followed by a passage to the cooling station and for this purpose is, e.g., deposited on a lower member preferably constituted by an annular frame.

The improvement according to the invention consists of carrying out hot gas blowing in the direction of the upper member between two treatments and optionally until the glass sheet is released onto the lower member. This directed hot gas blowing leads to an overheating of the upper member in such a way that its temperature can exceed by approximately 20° to 150° C. the temperature at which the glass sheets enter the cambering station.

It should be noted that the blowing according to the invention has the sole aim of reheating the upper member and optionally the rear face of the glass sheet, so that the reheating of the glass sheet is completed. This is a definite difference compared with the processes known, e.g., from EP-A-298426, according to which the glass sheet undergoes pneumatic pressing by means of a hot gas flow, whose function is to exert force on the glass and not to provide a permanently renewable heat supply.

On moving towards the upper member and more particularly when applied thereto, the glass sheet rapidly acquires the necessary additional amount of heat. Its temperature for entering the cambering station can be kept relatively low, below 650° C. or preferably 630° C. for a standard glass sheet with a thickness of 3.2 mm. For thinner glass, e.g., with a thickness of 2 mm, the temperature of the furnace is advantageously kept below 610° to 615° C. For thicker glass, e.g., 4 mm, the temperature of 630° C. can be maintained, the additional heating being supplied by the blowing according to the invention.

Advantageously, the hot gas blowing is not uniform, but is directed towards certain parts of the upper member, particularly the parts corresponding to the areas of the glass sheet having to undergo the greatest cambering and/or glazing and which are generally located in the vicinity of the edges of the glass sheet and consequently the upper member. However, even in this case, it is not a really local heating, in that between a third and a half of the surface of the upper member is subject to the action of the hot gas stream directed towards it.

This localization on the edges of the upper member can be obtained by maintaining between two glass plates the peripheral suction used for raising and applying the glass sheet and which is known from the aforementioned FR-A-2085464, EP-A-240418 and EP-A-241355. This suction creates a gas flow along the edges of the upper member, which are thus preferably superheated. The peripheral suction level used is preferably lower than that necessary for detaching the glass sheet above the roller conveyor, but can still be adequate to take up part of the weight of the glass sheet, which is advantageous for its positioning, because it can then be reoriented without any risk of marking by rollers.

Moreover, the hot gas blowing keeps the cambering station under a slight overpressure compared with the rest of the installation and in particular the building where it is installed. Therefore, there is a marked limitation to the entry of cold air into the cambering station, thus preventing any interference with the tempering blowing, which permits a better control of the shaping quality and leads to an improvement in the production rates. It is possible to simultaneously treat two glass plates or windows, the first still undergoing tempering when the shaping of the second commences.

The present inventors have found that the heating rate of a glass sheet in contact with a superheated upper member is substantially constant, with the exception of the first two seconds of the residence time, the time of this heating being up to approximately 10 seconds and often up to approximately 20 seconds. By modifying said residence time as a function of the different cases and variations possibly found in the contour, it is very easily possible to correct certain cambering defects, even if the temperature of the glass sheets entering the cambering station is inadequate for the desired radius of curvature. For a given glass sheet thickness, the operating parameters of the reheating furnace can thus be kept strictly constant and the only adjustments to be carried out relate to the intensity and/or the temperature of the hot gas flow directed against the upper member. These are two parameters which can be easily controlled and which also come into play at a relatively late stage in the glass plate production process, so that the efficiency of an adjustment can be very rapidly evaluated, which is not the case with the reheating furnace, whose thermal inertia is relatively high.

When the glass sheets are glazed, the crucial point is not the residence time in contact with the upper member, but the high temperature of the latter, which acts in the manner of a grill instantaneously bringing about the surface baking of the glaze. When considering for the same area of the glass sheet the need for a baking of the glaze and a shaping in accordance with a small radius of curvature, which is often the case for car windows such as rear windows having bent marginal wings and a glaze layer forming a frame for masking the adhesive used for fitting the window in the vehicle, it may be desirable to work with a highly superheated upper member, while maintaining a relatively long residence time in contact therewith.

The invention also relates to an apparatus for performing the process according to the invention. This apparatus is constituted by a station for the flat loading or infeeding of the glass sheets, a reheating furnace traversed by an, e.g., roller conveyor, a cambering station mounted at the end of the reheating furnace, constituted by a sealed enclosure provided with inlets and outlets, as well as a cooling and tempering station. The cambering station has an optionally shaping upper member, optional means for positioning the glass sheet beneath said upper member and means able to raise the glass sheet for engaging it against the upper member, means able to pass the glass sheet towards the cooling station, e.g., on depositing it on a lower member preferably constituted by an annular frame, whereby the cambering station is also provided with means able to produce a hot air flow in the direction of the upper member.

The means able to produce the hot gas flow are, e.g., constituted by one or more burners placed within the cambering station, e.g., beneath the roller conveyor. For safety reasons, these burners preferably operate continuously, the intensity and direction of the hot gas flow being, e.g., modified by means of deflectors. As a function of the position of said deflectors, the burners can simultaneously be used for maintaining hot conditions, e.g., close to the temperature of the glass sheets leaving the reheating furnace or for the superheating of certain parts of the upper member, and in particular its edges.

According to another and especially preferred embodiment of the invention, the hot gas flow is constituted by hot flue gases from one or more burners which are positioned outside the cambering station and which gases are fed into the latter by means of forced circulation pipes. For greater efficiency, these pipes are preferably mounted for movement with a frame integral with the upper member in its vertical movements. When the production line is in accordance with FR-A-2085464, EP-A-240418 or EP-A-241355, since the upper member is placed container under a vacuum, said container preferably serves as a support frame for the forced circulation pipes, openings being provided in the container walls to permit the passage of the flue gases in the direction of the upper member, the intercalated space between the upper member and the container being inadequate to allow the fitting of the pipes, which must therefore be fixed externally of the container.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
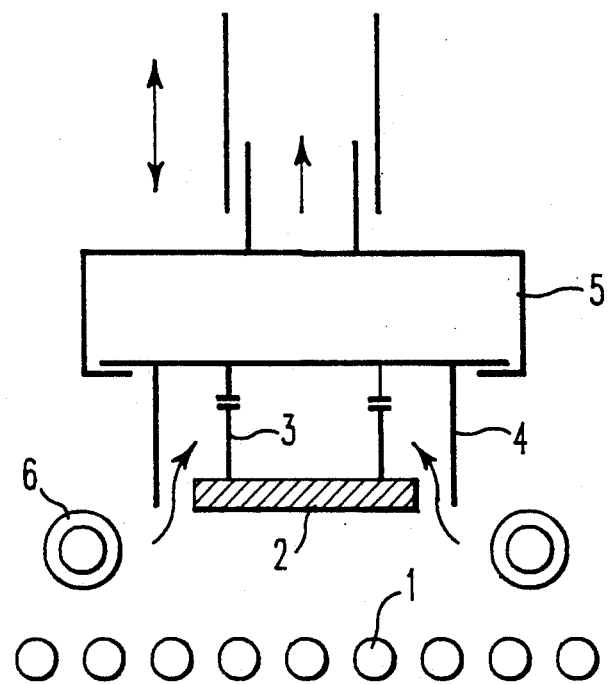
FIG. 1 is a diagrammatic view of a cambering station having a planar upper member and fixed forced circulation pipes.

FIG. 1 diagrammatically shows the essential components of a cambering station in which shaping takes place by inertia and gravity, in accordance with EP-A-3391 and EP-A-240418. After preheating in a traversing furnace, the glass sheet enters the cambering station on a roller conveyor 1. Even though the rollers have a small diameter, there is still a space between them, so that the latter support the glass in a non-uniform manner and the hot glass consequently sags under its own weight. By appropriate frontal and/or lateral positioning means, the glass sheet is stopped beneath a planar upper member 2, which is detachably fixed by bars 3 to a bottomless container 4, which slides by a slide-like system beneath a depressurized chamber 5. The latter is connected to a suction device of the vacuum pump type and can perform up and down movements. For a cambering cycle, the chamber 5 is lowered in such a way as to move the upper member 2 towards the glass sheet and the suction device is started up so as to produce a vacuum in the vicinity of the glass sheet periphery, which has the effect of raising the sheet and engaging it against the upper member whose surface is preferably provided with a covering which brings about a gentler glass-metal or glass-refractory ceramic contact. As soon as the glass sheet is in contact with the upper member 2, all the tools (2, 3, 4, 5) are raised, which makes it possible to introduce beneath the glass sheet a centrally open annular frame, whose periphery has the desired shape to be given to the glass sheet. The latter is then released onto the frame and, due to its high temperature, deforms thereon under the effect of gravity and possibly the inertia of its drop. Other details or information on this known cambering process can be gathered from the aforementioned publications.

According to the invention, the cambering station also has forced circulation ducts 6, which fully surround the container 4 and are here fixed level with the upper member 2 in the raised position, i.e., in the waiting position between two glass sheets. These ducts 6 are supplied with hot flue gases by a burner placed outside the cambering station and are, e.g., of the bladed or winged duct type. It is also possible to use burners placed directly in the cambering station or other heating and, in particular, radiant heating elements, and which in the latter case are associated with a permanent suction for the formation of a gas flow.

The ducts 6 preferably reheat the margin of the upper member 2 such that its temperature can at least locally exceed by roughly 150° C. the temperature of the glass sheet at its entry into the cambering station. On contact with the upper member 2, the glass sheet absorbs heat from the member 2 and increases its temperature, particularly at those portions facing the hottest zones of the upper member 2. The superheated zones of the glass sheets are more malleable and can be shaped according to a small radius of curvature. For the remaining parts of the glass sheet, which are slightly, or not, cambered, a temperature below 650° C. and preferably 630° C. is adequate to ensure correct tempering and consequently it is pointless to further preheat the glass sheet in the furnace.

By, e.g., modifying the orientation of the wings and/or the temperature of the hot flue gases and/or their flow rate, it is possible to modify the overheating of the upper member, both from the standpoint of heating intensity and that of the dimensions of the superheated surface. Therefore, it is possible to operate with the same furnace outlet temperature, which has the advantage, quite apart from the absence of the formation of optical defects, of an operation with constant furnace parameters, which ensures trouble-free operation. Moreover, the adjustments relating to the superheating parameters for the upper member are very fast and their effect is almost immediate.

The above description relates to a unit for the production of cambered-tempered windows, but the same unit can be used for tempering without cambering of glazed glass sheets, the annular frame taking up the glass sheets released by the upper member having in this case a flat profile. This annular frame is also used as a support for the glass sheets during tempering.

The invention is also applicable to cambering installations in which the glass is raised by a vacuum created above the complete glass sheet surface, or which can be mechanically raised by means of a frame. The glass can also be shaped by means of a rising hot gas flow. In the latter case, two rising hot gas flows act in turn, the first, according to the invention, serving to superheat the upper member, while the second is directed at the glass sheet and makes it possible to bring about a certain pneumatic pressing. The second rising flow must be interrupted or at least greatly reduced during the positioning of a glass sheet beneath the upper member.

Figure 2:
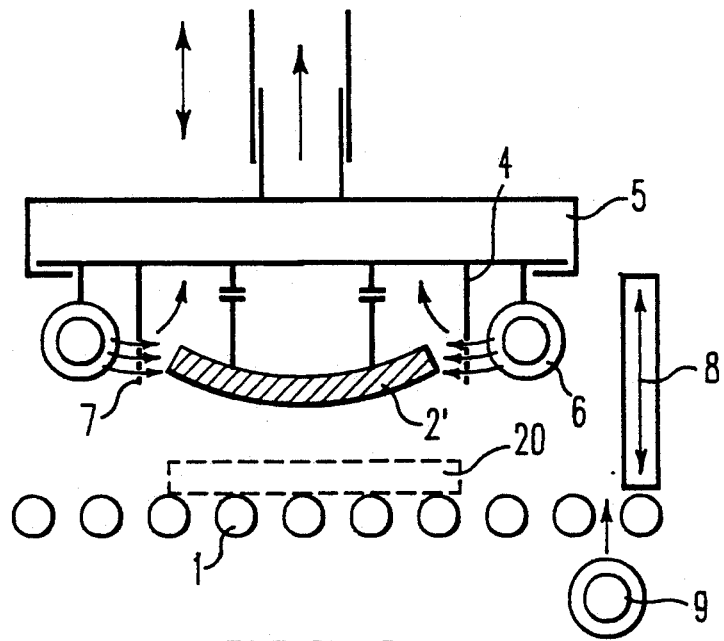
FIG. 2 is a diagrammatic view of another cambering station having a convex upper member and forced circulation pipes fixed to the container which is under a vacuum.

FIG. 2 is a diagrammatic view of a variant of the invention. As hereinbefore the cambering station has a conveyor 1 above which is placed, at a variable height, a depressurized chamber 5, beneath which is placed a bottomless container 4, in which an upper member 2' is mounted on bars 3. In this case the upper member 2' is constituted by a convex, male cambering mold, whose curvature corresponds entirely or partly to the curvature which it is wished to give to the glass sheet. After being deformed and adopting the curvature of the upper member 2', the molded or preshaped glass sheet is placed on a female cambering mold 20, e.g., one constituted by an annular frame, on which it is passed to the cooling and tempering station. The process and cambering tools used are described in detail in FR-A-2085464 and EP-A-241355.

In the present variant, the forced circulation ducts 6 are fixed to the container 4 and therefore follow the vertical movement of the upper member 2. The ducts 6 are connected to the ducts carrying the flue gases from the burners into the cambering station using tubes made from a material able to withstand the high temperature in the cambering station or by arrangements of tubes sliding within one another. The ducts 6 can be fixed within the container or, as here, are located outside the same, opening 7 being provided in the walls of the container 4 to permit the passage of the hot flue gases towards the upper member 2 and as indicated by the arrows.

Advantageously, the cambering station is also provided with means able to produce a hot gas flow parallel to the door 8 communicating with the tempering station. These means complete the effect of the overpressure due to the blowing of hot air by ducts 6, so as to prevent any penetration of cold air into the cambering station enclosure. These means are, e.g., constituted by a forced circulation duct 9, which is preferably branched from the main ducts 6 and which can be supplied permanently or only on opening the door 8.

The invention is more particularly suitable for producing glass plates or windows having a glazed frame and a high optical quality. It can advantageously be used in an existing production unit and consequently leads to an increase in the range of products thereof.

What is claimed as new and desired to be secured by Letters Patent of the United States is:

1. An apparatus for cambering glass sheets, comprising:
   a cambering station;
   a conveyor for transferring a heated glass sheet from a reheating furnace to said cambering station;
   a shaping upper member in said cambering station;
   a bottomless container mounted in surrounding relation to said upper member;
   means for engaging the glass sheet with said upper member so as to camber the glass sheet;
   means including forced circulation ducts for blowing hot gas onto said upper member in such a way as to increase the temperature thereof to a temperature higher than that of the glass sheet when the glass sheet enters the cambering station, wherein said upper member is mounted in the bottomless container surrounding the upper member and wherein said ducts are mounted for movement with the bottomless container; and
   means for discharging the cambered glass sheet to a cooling station.

2. Apparatus according to claim 1, wherein the forced circulation ducts are fixed to the bottomless container outside the bottomless container, and wherein openings are provided in walls of said container so as to permit the passage of gases blown in the direction of the upper member.

* * * * *